(12) United States Patent
De Wilde et al.

(10) Patent No.: US 9,664,776 B2
(45) Date of Patent: May 30, 2017

(54) DEVICE FOR WARNING OF RADAR TRAPS

(71) Applicants: Tom Marnix Alexander De Wilde, Hillegom (NL); Patrick Dijkstra, Driebruggen (NL)

(72) Inventors: Tom Marnix Alexander De Wilde, Hillegom (NL); Patrick Dijkstra, Driebruggen (NL)

( * ) Notice: Subject to any disclaimer, the term of this patent is extended or adjusted under 35 U.S.C. 154(b) by 0 days.

(21) Appl. No.: 14/992,656

(22) Filed: Jan. 11, 2016

(65) Prior Publication Data

US 2016/0116571 A1    Apr. 28, 2016

Related U.S. Application Data

(63) Continuation of application No. 13/683,063, filed on Nov. 21, 2012, now Pat. No. 9,255,987.

(30) Foreign Application Priority Data

May 4, 2012   (NL) ..................................... 2008757

(51) Int. Cl.
*G01S 7/40*     (2006.01)
*G01S 7/02*     (2006.01)
*G01S 13/88*    (2006.01)

(52) U.S. Cl.
CPC ............ *G01S 7/022* (2013.01); *G01S 13/886* (2013.01)

(58) Field of Classification Search
CPC ........................................................ G01S 7/022
USPC .......................................................... 342/20
See application file for complete search history.

(56) References Cited

U.S. PATENT DOCUMENTS

| | | | |
|---|---|---|---|
| 6,201,493 B1* | 3/2001 | Silverman ...................... | 342/20 |
| 2004/0263378 A1* | 12/2004 | Jossef et al. .................... | 342/20 |
| 2010/0019948 A1* | 1/2010 | Newham et al. ............... | 342/20 |
| 2010/0214148 A1* | 8/2010 | Kuhn .............................. | 342/20 |
| 2010/0214149 A1* | 8/2010 | Kuhn .............................. | 342/20 |
| 2013/0293407 A1* | 11/2013 | De Wilde et al. .............. | 342/20 |

* cited by examiner

*Primary Examiner* — John B Sotomayor
(74) *Attorney, Agent, or Firm* — Attentive Law; Paul Ratcliffe

(57) ABSTRACT

The invention relates to a device for warning of radar traps or speed radar signals, comprising a radar detection antenna, a central processing unit, which is connected to the radar detection antenna, an alert device or unit, which is connected to the central processing unit and which is designed for delivering an alarm, wherein the central processing unit is designed for determining at least one characteristic of the signal received by the radar detection antenna and for causing the alert device to deliver an alarm or suppress the delivery of an alarm in dependence on least one determined characteristic.

12 Claims, 3 Drawing Sheets

DEVICE FOR WARNING OF RADAR TRAPS

RELATED APPLICATION

This application is a Continuation of U.S. patent application Ser. No. 13/683,063, filed on Nov. 21, 2012 entitled "Device for Warning of Radar Traps", which is incorporated herein by reference in its entirety. This application and U.S. patent application Ser. No. 13/683,063, claims the benefit of and priority to Dutch patent application NL 2008757 filed on May 4, 2012, the entirety of which is incorporated herein by reference.

BACKGROUND OF THE INVENTION

1. Field of the Invention

The present invention relates to a device for warning of radar traps, comprising a radar detection antenna, a central processing unit, which is connected to the radar detection antenna, an alert device, which is connected to the central processing unit and which is designed for delivering an alarm, wherein the central processing unit is designed for determining at least one characteristic of the signal received by the radar detection antenna and for causing the alert device to deliver an alarm or suppress the delivery of an alarm in dependence on said at least one determined characteristic.

2. Description of the Related Art

Radar detectors for detecting police radar speed measurement systems are currently faced with a great deal of trouble in the form of false alarms caused by all kinds of high-frequency sources that use the same radar frequency bands as those used by police speed measurement equipment. Especially (but not exclusively) the 24 GHz K-band is frequently used for alternative applications, such as radar devices for opening automatic sliding doors, traffic flow measurement systems beside roads and motorways, blind spot radars and adaptive cruise control devices on board vehicles, and similar type systems or devices.

A known method for distinguishing between false alarms and real police radar speed measurement systems makes use of a database in which the GPS locations of false alarms are stored. However, the degree of distinction between police traps and false alarms achieved with this method is limited.

Therefore, what is needed is a system, method, or device which distinguishes between false alarms and real police radar systems independent of, or in addition to, a database of police radar systems based on GPS locations.

SUMMARY OF THE INVENTION

This summary is provided to introduce concepts in a simplified form that are further described in the detailed description of the invention. This summary is not intended to be the sole description for the identification of key or essential inventive concepts of the claimed subject matter, nor is it intended as the sole description for determining the scope of the claimed subject matter.

The present invention provides a system by means of which it is possible to distinguish between false alarms and real police radar systems independently of, or in addition to, a database comprising known false alarms, and/or by means of which police radar systems so far unknown can be more readily distinguished.

In order to achieve the objective or the presentation invention, the present invention includes one or more components which can determine at least one characteristic or property of the signal detected or received. The characteristics or properties may comprise one or more of the following: (1) the frequency of the signal; (2) the amplitude of the signal, or the maximum amplitude that occurred upon passing the radar source; (3) the structure of the amplitude of the signal received by the radar detection antenna over a predetermined distance covered by the vehicle; (4) the modulation frequency of an amplitude modulation signal received by the radar detection antenna; (5) the modulation depth of an amplitude modulation signal received by the radar detection antenna; (6) the modulation frequency of a frequency modulation signal received by the radar detection antenna; (7) the frequency sweep of a frequency modulation signal received by the radar detection antenna; (8) the phase of a phase modulation signal received by the radar detection antenna; (9) the modulation frequency of a phase modulation signal received by the radar detection antenna; (10) the duty cycle of a pulse modulation signal received by the radar detection antenna; (11) the modulation frequency of a pulse modulation signal received by the radar detection antenna; (12) the frequency stability of the signal received by the radar detection antenna; and/or (13) the phase noise of the signal received by the radar detection antenna.

In an exemplary embodiment, at least one characteristic determined and utilized by the present invention is the frequency stability and/or the phase noise of the signal received by the radar detection antenna. The exemplary embodiment may further comprise determination and use of the frequency of the signal received by the radar detection antenna.

By determining one or more of the characteristics of the radar signal, it is possible to determine the probability that the signal is (or is not) coming from a real police radar system. Based on the probability, the system can determine whether delivery of an alarm is or is not wanted and based on said determination the device may or may not deliver an alarm. Based on said information it is also possible to determine what kind of alarm is to be delivered, for example an alarm having a high or a low priority. Furthermore, the measured characteristics of the radar signal can be combined with other characteristics detected by the system, such as the presence of a signal from a portable transmitter-receiver which may be indicative of a police presence.

The components of the system or device are designed for determining one, more than one or all of the signal characteristics. In one exemplary embodiment, a central processing unit (CPU) is designed determining one, more than one, or all of the characteristics. The CPU may also determine and cause the alert device to deliver an alarm or suppress the delivery of an alarm in dependence on a combination of the determined characteristics.

The present invention may make use of one or more methods or processes to analyse the signal. In an exemplary embodiment, the system will make use of one or more algorithms to analyse the signal. Such algorithm may be a fuzzy logic algorithm. According to the algorithm, a measured value is preferably allocated to each of the determined characteristics, and the measured values are each multiplied by a weighting factor allocated to the characteristic in advance, which weighting factors have been made dependent on the values of the characteristics in accordance with predetermined functions so as to obtain weighted characteristic values. The weighted characteristic values are added to obtain a signal profile value which is then compared to at least one threshold value. Depending on the outcome of the comparison between the signal profile value and the threshold value an alarm may be delivered or suppressed. The threshold values may be adjustable as the system level or by the user so that a more sensitive or a less sensitive system can be obtained.

The system of the present invention then utilizes the determined profile of the received signal to determine whether the signal in question concerns a false radar signal or an actual police radar trap. The system may determine a total threshold value for the entire profile, a threshold value for each individual characteristic, or a threshold value for one or more groups of characteristics.

In a preferred embodiment, the system comprises a database of known profiles of radar signals that are specific for certain police radar speed measurement systems. Based on a comparison of the profile of a detected signal compared to the profiles in the database, an alarm can be directly generated as soon as the profile of a radar signal, within a certain tolerance, corresponds to a known police radar profile from the database. The radar detector system of the present invention may also indicate the type and/or make of the police radar speed measurement system. For example, the system may indicate the type and/or make by displaying text on a monitor or display or in audible form through a speaker.

An exemplary embodiment of the system of the present invention may also comprise a database of known profiles of false radar signals that are specific for certain false alarm applications. Such false signal profiles might include radar systems for door openers or flow measurement systems. The system can determine the profile of a received signal and compare it to the database of false signal profiles to determine, within a certain tolerance, if the detected signal corresponds to a known false alarm radar profile from the database. The system can then suppress any alarm as soon as the system determines the detected radar signal corresponds to a known false alarm radar profile.

In a preferred embodiment, the present invention also includes a user input function or means which enable the user to indicate if a detected signal, and its corresponding profile is an actual police radar signal or a false signal; or alternatively if the delivery of an alarm is to be suppressed and/or if an alarm is to be delivered. Such action by the user could be used to modify the algorithm and or add or modify profiles in the one or more databases.

The present invention can also be modified by changing the algorithm by modifying one or more of the weighting factors or predetermined dependence functions of the weighting factors. The system can be configured to enable the user to press one or more input buttons upon delivery or notification of a radar alarm signal to indicate that the radar in question is a police radar. Based on the information, properties and identified characteristics of the signal a profile is determined. The system then knows the saved profile properties associated with the police radar system in question and the next time a radar signal having the same (or practically the same) profile properties is received, the radar alarm can be recognized as emanating from a police radar trap, so that an alarm can be generated. Further, the saved profiles from a plurality of users can be shared between users via a network.

The system may also be comprised of a self-learning function, wherein the values of the determined characteristics of each detected signal are stored in a database, and wherein it is determined on the basis of an analysis of the stored characteristics to what extent signals correspond to known signals, and in the case that signals correspond to known signals, that said signals are allocated the same status as the known signal so as to cause an alarm to be delivered or suppressed upon detection of said signal. Such data or information can be shared between users via a network. A network herein or anywhere else identified in this application could be a cellular network, wireless personal area network, wireless local area network, wireless mesh network, wireless metropolitan area network, or wireless wide area network.

The present invention also provides a radar detector for alerting a user of a speed radar signal where the detector is comprised of a radar detection antenna for receiving the speed radar signal; an alert unit for alerting the user of the presence of the speed radar signal; a central processing unit connected to the antenna and the alert unit, wherein the central processing unit determines at least one characteristic of the signal and controls the delivery of an alarm to the alert unit based upon the at least one characteristic. The at least one determined characteristic is comprised from one of the following: (1) the structure of the amplitude of the signal over a predetermined distance covered by the vehicle; (2) the modulation frequency of an amplitude modulation signal; (3) the modulation depth of an amplitude modulation signal; (4) the modulation frequency of a frequency modulation on the signal; (5) the frequency sweep of a frequency modulation on the signal; (6) the phase of a phase modulation signal; (7) the modulation frequency of a phase modulation signal; (8) the duty cycle of a pulse modulation signal; (9) the modulation frequency of a pulse modulation signal; (10) the frequency stability of the signal; or (11) the phase noise of the signal. The alarm may be controlled by transmitting or suppressing an alarm signal to the alert unit.

The radar detector may also operate by having the central processing unit determines at least two characteristics of the signal where the central processing unit controls the delivery of an alarm to the alert unit based upon a combination of the at least two determined characteristics. The CPU may also determine a profile of the signal or a profile value of the signal based upon at least one of the determined characteristics. The CPU may make use of one or more algorithms to determine the profile to profile value where the algorithm may be functional through an application or software code. The algorithm may be a fuzzy logic algorithm. The algorithm may employ a process in which a measured value is allocated to each of the determined characteristics, where the measured values are each multiplied by a characteristic specific weighting factor to obtain weighted characteristic values, whereupon the weighted characteristic values are added to obtain a signal profile value. The signal profile value may be compared to the at least one threshold value and depending on the outcome of the comparison controls the alarm. The threshold value or values are adjustable. Further, the algorithm can be changed by changing one or more of the characteristic specific weighting factors.

The radar detector may be configured such that the system at least determines the characteristic of the frequency stability of the signal and/or the phase noise of the signal. The radar detector may be configured such that the system at least determines the characteristic of the frequency of the signal. Further, the radar detector may include one or more input features or an input unit for receiving the input from a user. The user input may control the alarm upon detection of a radar signal.

The radar detector may further include a self-learning function where the historical values of the determined characteristics of past detected signals are stored in a database. As new signals are received and their characteristics determined they are compared to the historical values and such comparison is used to control the alarm.

The present invention also provides a radar detector for generating an alert in response to a speed radar signal comprising: a radar detection antenna for receiving a signal; an alert unit for alerting the user of the presence of a speed radar signal; a memory unit for storing at least one database; a central processing unit connected to the antenna, the alert unit, and the memory unit which determines at least one characteristic of the received signal and generates a profile of the signal based upon the at least one determined characteristic, wherein the signal profile is compared to known profiles in the at least one database and based upon the comparison controls the delivery of an alarm to the alert unit.

The present invention also provides a method of controlling an alert signal, by a device, upon receiving a speed radar signal, the method comprising the steps of: detecting the incoming speed radar signal; determining at least one characteristic of the speed radar signal; generating a profile of the speed radar signal based upon the at least one characteristic; comparing the profile to one or more known profiles; and controlling an alert signal based upon the results of the comparison.

The present invention also provides a radar detector for generating an alert in response to a speed radar signal comprising: a radar detection antenna for receiving a signal; an alert unit for alerting the user of the presence of a speed radar signal; a memory unit for storing at least one database; a central processing unit connected to the antenna, the alert unit, and the memory unit which determines at least one characteristic of the received signal and generates a signal profile value of the signal based upon the at least one determined characteristic, wherein the signal profile value is compared to a threshold value and based upon the comparison controls the delivery of an alarm to the alert unit.

The present invention also provides a method of controlling an alert signal, by a device, upon receiving a speed radar signal, the method comprising the steps of: detecting the incoming speed radar signal; determining at least one characteristic of the speed radar signal; generating a signal profile value of the speed radar signal based upon the at least one characteristic; comparing the signal profile value to a threshold value; and controlling an alert signal based upon the results of the comparison.

These and other objects, features, and/or advantages may accrue from various aspects of embodiments of the present invention, as described in more detail below.

BRIEF DESCRIPTION OF THE DRAWINGS

The foregoing summary, as well as the following detailed description of the invention, is better understood when read in conjunction with the appended drawing. For the purpose of illustrating the invention, exemplary constructions of the invention are shown in the drawings. However, the invention is not limited to the specific methods and instrumentalities disclosed herein.

DETAILED DESCRIPTION OF EXEMPLARY EMBODIMENTS

Particular embodiments of the present invention will now be described in greater detail with reference to the figures.

Figure 1:
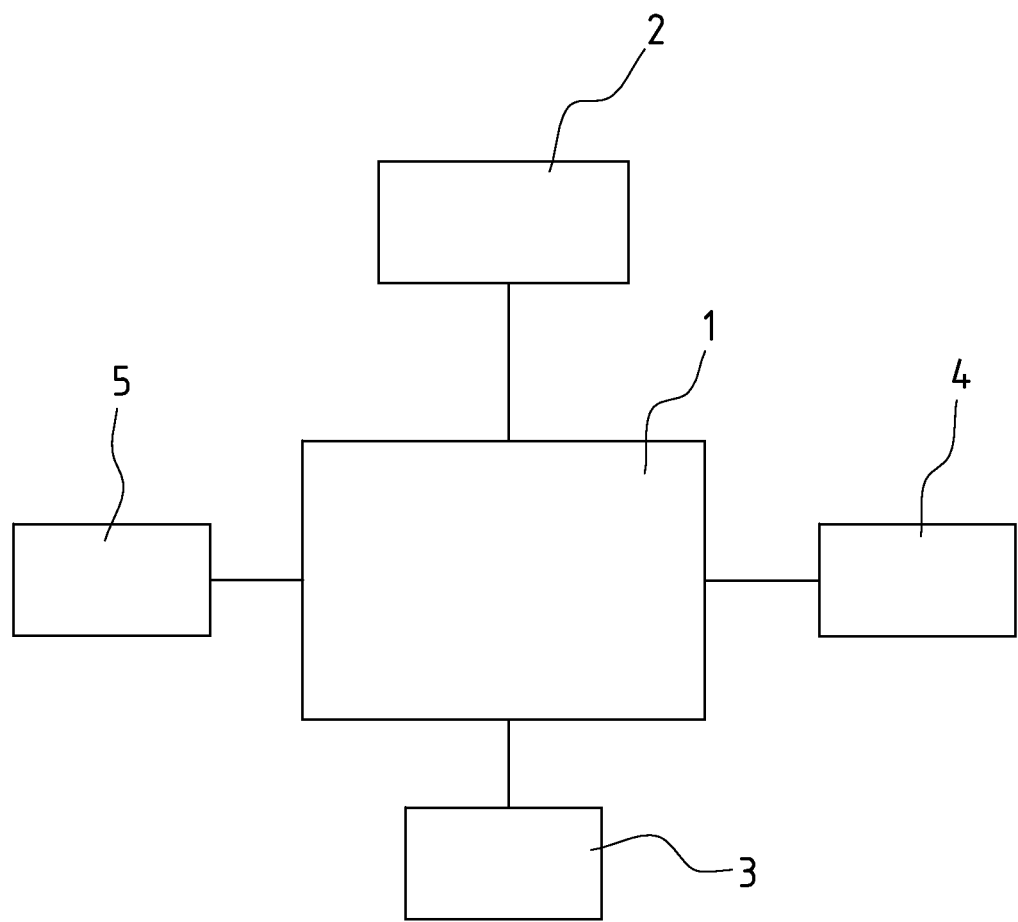
FIG. 1 is a schematic block diagram of a device according to the invention.

In accordance with FIG. 1, the present invention provides a device for warning of radar traps which comprises a central processing unit 1, a radar detection antenna 2, a user interface 3, and at least one memory unit 4 capable of storing at least one database; and a global positioning satellite (GPS) or location unit 5. The central processing unit 1 is provided with a digital signal processing unit which is connected to and in communication with the radar detection antenna 2. The user interface 3 is also connected to and in communication with the central processing unit 1. The user interface 3 may comprise a display screen and a loudspeaker. The loudspeaker acts as an alert device and is capable of delivering an acoustic alarm. The display screen may also act as an alert device and is capable of delivering a visual alarm.

The central processing unit 1 is designed for determining characteristics of the radar signal received by the radar detection antenna 2 and causing the alert device, the loudspeaker or display, to deliver an alarm or to suppress the delivery of an alarm in dependence on said characteristics.

The present invention or device utilizes a receiver designed and configured to enable the digital signal processing unit to accurately analyse the received radar signal. The analysis of the received or detected radar signal utilizes known techniques, such as digital filtering (digital radio), demodulation of the received signal and FFT analysis of the detected signal to accurately analyse the signal. Based on the detected signal characteristics a signal profile is determined.

The profile of the detected radar signal is determined by examining the received signal for the following signal properties:

1) the frequency of the signal;
2) the amplitude of the signal, or the maximum amplitude that occurred upon passing the radar source;
3) the structure of the amplitude of the signal over a predetermined distance covered by the vehicle;
4) the modulation frequency of an amplitude modulation radar signal;
5) the modulation depth of an amplitude modulation radar signal;
6) the modulation frequency of a frequency modulation on the radar signal;
7) the frequency sweep of a frequency modulation radar signal;
8) the phase of a phase modulation radar signal;
9) the modulation frequency of a phase modulation radar signal;
10) the duty cycle of a pulse modulation radar signal;
11) the modulation frequency of a pulse modulation radar signal;
12) the frequency stability of the received radar signal;
13) the phase noise of the radar signal.

By way of an example, the system of the present invention can assess whether the radar signal comprises a 50/60 Hz AM and/or FM modulation component. Through such assessment the system can whether the radar system is fed from a fixed supply voltage with a 50 Hz or a 60 Hz modulation frequency. Mobile police radar measurement systems are frequently fed from a car battery and consequently will not comprise a 50 or 60 Hz modulation component. Thereby, the system can use such information to intelligently profile signals.

Oftentimes, Police radar systems use pulsed radar signals. Pulsed radar signals have a specific character or profile and such profile can be recognised and compared against captured signals to determine is a signal is coming from a "real" police radar.

In contrast, radar systems for traffic flow measurement devices frequently use very wide band frequency modulation. Such wide band frequency modulation can be determined and profiled, making it possible for traffic flow measurement devices to be recognised as "false" signals or false alarms.

Inexpensive radar sources for automatic door openers, for example garage door openers, can often be recognised by their poor phase noise and frequency stability. Such characteristics or signal profiles can be determined and stored in the database in memory 4.

The central processing unit 1 is loaded with at least one computer program or software application or code designed for determining, on the basis of the combination of the characteristics analysed from a detected signal, whether the detected signal characteristics or profile match the characteristics or profile of a known "real" radar detector or of a "false" signal. Such determination dictates whether the receipt of an alarm by a user is desired. If the chance is greater than a predetermined probability value that the signal profile or a characteristic of the signal matches a real radar detection signal the user is alerted via the interface 3 to the fact that a police radar trap has been detected. The probability value of the detected signal can be determined, for example, by means of an algorithm implemented in the computer program, in which the determined characteristics of the detected signal are evaluated, resulting in a decision on whether or not to deliver an alarm. The determination can be based on a profile of the signal or can be based on one characteristic, multiple characteristics, or all characteristics of the detected signal.

Figure 2:
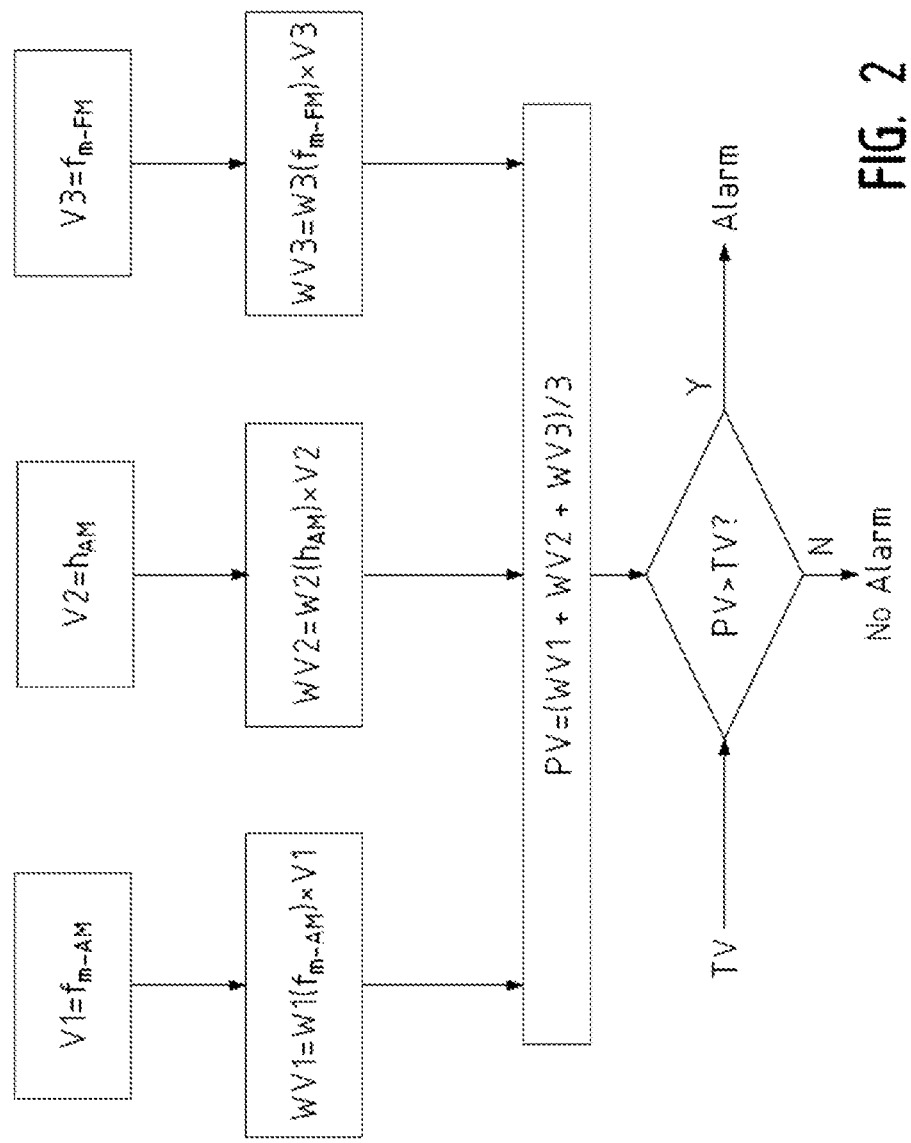
FIG. 2 shows an example of an algorithm that is used according to the invention.
Figure 3A:
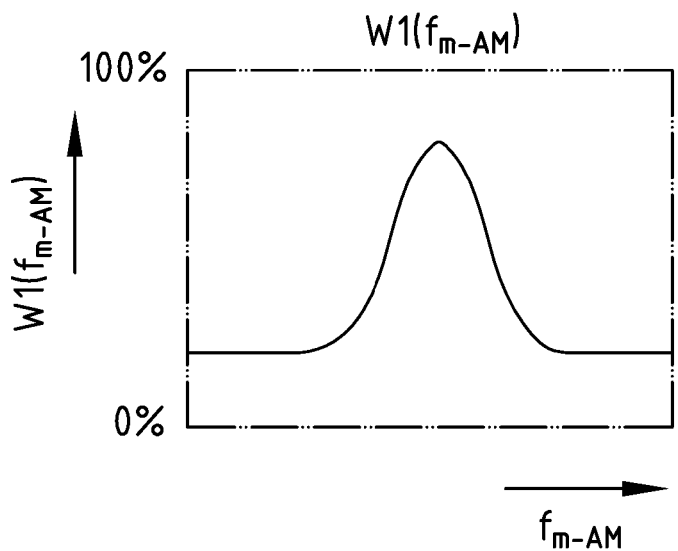
FIG. 3A shows a graph depicting the determination of weighting factors related to the AM modulation frequency in accordance with the algorithm of FIG. 2.
Figure 3B:
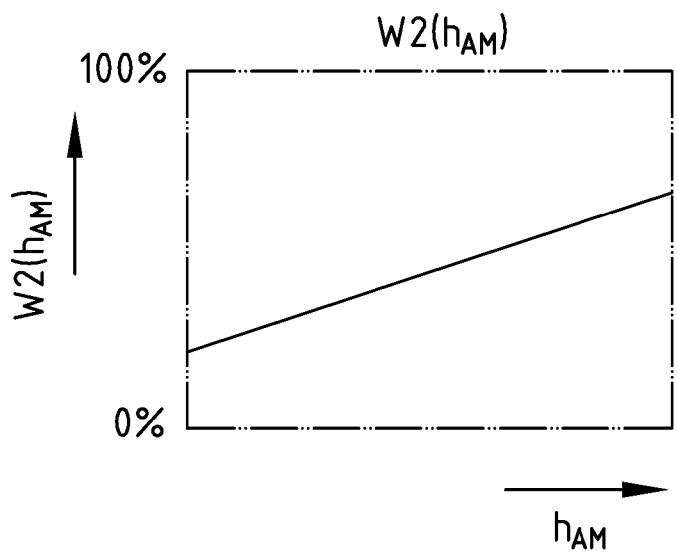
FIG. 3B shows a graph depicting the determination of weighting factors related to the FM modulation depth in accordance with the algorithm of FIG. 2.
Figure 3C:
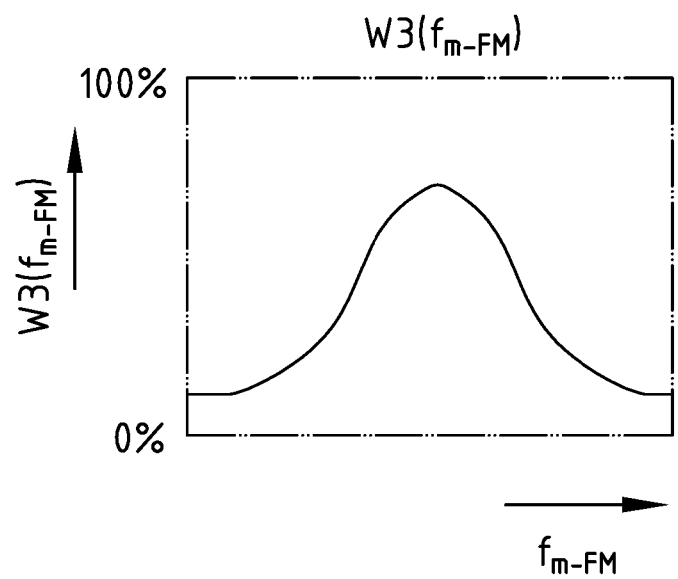
FIG. 3C shows a graph depicting the determination of weighting factors related to the FM modulation frequency in accordance with the algorithm of FIG. 2.

In a preferred embodiment, the algorithm used to make such determination utilizes a "fuzzy logic" technique. According to one embodiment of the present invention as depicted in FIG. 2, the characteristics AM modulation frequency ($f_{M-AM}$), a FM modulation depth ($h_{AM}$) and FM modulation frequency ($f_{m-FM}$) are determined. Each of the determined characteristics is allocated a measured value (V1, V2, V3). The measured values (V1, V2, V3) are each multiplied by a weighting factor (W1, W2, W3) allocated to the characteristic in advance so as to obtain weighted characteristic values (WV1, WV2, WV3). The weighting factors (W1, W2, W3) have been made dependent on the values (V1, V2, V3) of the characteristics according to predetermined functions shown in FIGS. 3A, 3B, 3C, for example in the form of look-up tables, graphs or mathematical functions. The weighted characteristic values (WV1, WV2, WV3) are then averaged to a signal profile value (PV), whereupon the signal profile value (PV) is compared with a threshold value (TV). Depending on the outcome of the comparison between the signal profile value (PV) and the threshold value (TV), an alarm is delivered or suppressed.

As depicted in FIG. 1, the device also includes a memory unit 4 capable of storing one or more databases of known profiles of radar signals that are specific to certain police radar speed measurement systems. Based on the profiles of known police radar speed measurement systems in the database, an alarm can be directly generated as soon as a detected radar signal, within a certain tolerance or probability, corresponds to a known police radar profile from the database. The radar detector system of the present invention may also indicate the type and/or make of the police radar speed measurement system. For example, the system may provide a text notification visible on the display screen of the user interface 3 or in the form of a spoken text. The memory unit 4 with one or more databases may also comprise known profiles of false radar signals that are specific for certain false alarm applications. Such false alarm application might include radar systems for door openers or flow measurement systems. Based on the false radar signal profiles stored in the database, a received radar signal can analysed and determined if its profile or characteristics match those of profiles or characteristics in the false signal database. If the detected signal is determined to correspond, within a certain tolerance, to a known false alarm radar profile from the database then the system can suppress an alarm.

The device further comprises input means by which the user can teach the system when the delivery of an alarm is desired. For example, when a user knows the device has just received a real speed detection signal the user can press a button on the device (or a display connected to the device) which verifies or indicates that the received signal in question is a real police radar signal. Based on the user input and the detected signal information, the system knows what profile properties are associated with the police radar system in question, the profile can be stores and the algorithm can be adjusted.

By analysing and grouping the profiles from the database into police radar group profiles having (substantially) the same profile properties, it can be decided in the case of a next signal received whether the signal detected falls within a specific police radar group profile and therefore, whether an alarm should be delivered.

In the event that a detected signal is analysed and determined that it fits both in the group of profiles of real speed detection profiles and in the group of profiles of a false alarm signals then it is an indication that the system does not have sufficient information regarding the detected signal to make an exact or highly accurate decision. In such a case, the present invention may make the determination on whether to send or suppress and alarm based on the number of signals in both profile groups.

The present invention may also comprise an input function which enables the user to teach the system when a radar signal concerns a false alarm. Such can be accomplished when the user presses a button during a radar alarm to indicate that the alarm in question is a false alarm. Based on said information, the system knows what profile properties are associated with the false alarm and can store or update the false alarm profiles. Therefore, the next time a radar signal having the same (or practically the same) profile properties is received, the radar alarm can be suppressed. The user input function for both real and false signals can be through one or more user input buttons on the device or through one or more menu driven interfaces including touch screen interfaces.

The system of the present invention may also comprise a self-learning function, wherein the specific signal properties of each detected signal are automatically registered in to one or more databases. On the basis of an analysis of all the stored profiles it can be determined to what extent profiles correspond to each other. Strongly corresponding profiles can be classed into so-called group profiles. Said group profiles can later be used for determining whether a received signal is more likely to be a signal related to a false alarm or a real alarm. Further, the analysis can analyse the entire profile, one characteristic or more than one characteristic of any combination. By way of example, the system may determine that signal profiles with a high PV number (indicative of a real alarm) which also have a high noise characteristic (indicative of a false alarm) should be grouped as false alarm profiles. The analysis and grouping can take place in the system itself or via a central server where all the data are collected and processed. The individual devices of the present invention including the databases can then be updated remotely to provide updated profiles. Such updates can be wireless or via a computer connected to the network.

The system of the present invention also preferably comprises the option that the self-learning feature is partially determined by the whether the detected radar signal was present at the same location, within a certain radius, for example a radius of 50 metres, as during a particular preceding period, for example the preceding week. The location based information can be determined by means of a GPS or location based system 5 which is connected to the central processor 1. Since mobile police units do not set up their speed measurement systems at the same location every day the number of times a radar signal is present at the same location may be indicative of whether the signal in question concerns a real alarm or a false alarm. If the detected radar signal is invariably present at the same location most times, the system will assume that the signal is a false alarm signal, if the radar signal is occasionally present, the system will assume that it concerns a mobile police radar measurement system.

The examples provided herein are merely for the purpose of explanation and are in no way to be construed as limiting of the present method and product disclosed herein. While the invention has been described with reference to various embodiments, it is understood that the words which have been used herein are words of description and illustration, rather than words of limitation. Further, although the invention has been described herein with reference to particular means, materials, and embodiments, the invention is not intended to be limited to the particulars disclosed herein; rather, the invention expands to all functionally equivalent structures, methods and uses, such as are within the scope of the appended claims. Those skilled in the art, having the benefit of the teachings of this specification, may affect numerous modifications thereto and changes may be made without departing from the scope and spirit of the invention.

It will be recognized by those skilled in the art that changes or modifications may be made to the above described embodiment without departing from the broad inventive concepts of the invention. It is understood therefore that the invention is not limited to the particular embodiment which is described, but is intended to cover all modifications and changes within the scope and spirit of the invention.

What is claimed is:

1. A radar detector for alerting a user of a speed radar signal, the device comprising:
   a radar detection antenna unit, wherein the antenna unit is enabled to receive at least one speed radar signal;
   a memory unit, wherein the memory unit stores at least one known radar signal characteristic;
   wherein the at least one known radar signal characteristic is comprised of at least one of: the structure of the amplitude of the signal over a predetermined distance; the modulation frequency of an amplitude modulation on the signal; the modulation depth of an amplitude modulation on the signal; the modulation frequency of a frequency modulation on the signal; the frequency sweep of a frequency modulation on the signal; the phase of a phase modulation on the signal; the modulation frequency of a phase modulation on the signal; the duty cycle of a pulse modulation on the signal; the modulation frequency of a pulse modulation on the signal; the frequency stability of the signal; or the phase noise of the signal;
   an alert unit for alerting the user of the presence of a speed radar signal; and
   a central processing unit, coupled with the memory unit, the alarm unit and connected to the antenna unit, wherein the central processing unit compares the at least one signal characteristic of the at least one speed radar signal received by the antenna unit with the at least one known radar signal characteristic stored in memory; and suppresses the delivery of an alarm activation signal when there is a signal characteristic match.

2. The radar detector of claim 1, further comprising software associated with the central processing unit, wherein the software includes an algorithm used for comparing the at least one signal characteristic of the at least one speed radar signal received by the antenna unit with the at least one known radar signal characteristic stored in memory.

3. The radar detector of claim 1, further comprising software associated with the central processing unit, wherein the software includes a fuzzy logic algorithm used for comparing the at least one signal characteristic of the at least one speed radar signal received by the antenna unit with the at least one known radar signal characteristic stored in memory.

4. The radar detector of claim 1, further comprising a signal profile value database containing at least one signal profile value, wherein a measured value is allocated to each of the determined characteristics, wherein the measured values are each multiplied by a characteristic specific weighting factor to obtain weighted characteristic values, whereupon the weighted characteristic values are added to obtain a signal profile value which is stored in the signal profile value database.

5. The radar detector of claim 1, further comprising a signal profile threshold value database containing at least one signal profile threshold value wherein a signal profile value of a received signal is determined and compared to at least one threshold value by the central processing unit and depending on the comparison controls the alarm unit.

6. The radar detector of claim 5, further comprising a user interface for adjusting the signal profile threshold value.

7. The radar detector of claim 1, further comprising an input unit for receiving the input from a user which controls the alarm upon detection of a radar signal.

8. The radar detector according to claim 2, further comprising an input unit for receiving input to alter the one or more of the characteristic specific weighting factors to change the algorithm.

9. A radar detector for generating an alert in response to a speed radar signal comprising:
   a radar detection antenna for receiving a signal;
   an alert unit for alerting the user of the presence of a speed radar signal;
   a memory unit for storing at least one database containing a plurality of known radar signal profiles;
   wherein the plurality of known radar signal profiles is determined from at least one radar signal characteristic from the following: the structure of the amplitude of the signal over a predetermined distance; the modulation frequency of an amplitude modulation on the signal; the modulation depth of an amplitude modulation on the signal; the modulation frequency of a frequency modulation on the signal; the frequency sweep of a frequency modulation on the signal; the phase of a phase modulation on the signal; the modulation frequency of a phase modulation on the signal; the duty cycle of a pulse modulation on the signal; the modulation frequency of a pulse modulation on the signal; the frequency stability of the signal; or the phase noise of the signal; and a central processing unit connected to the antenna, the alert unit, and the memory unit, wherein the central processing unit determines at least one characteristic of the received signal and generates a profile of the received signal based upon the at least one determined characteristic, wherein the signal profile is compared to known profiles in the at least one database and based upon the comparison suppresses the delivery of an alarm activation signal to the alert unit.

10. A method of controlling an alert signal, by a device, upon receiving a speed radar signal, the method comprising the steps of: detecting the incoming speed radar signal; determining at least one characteristic of the speed radar signal; wherein the at least one radar signal characteristic is comprised of one of the following: the structure of the amplitude of the signal over a predetermined distance; the modulation frequency of an amplitude modulation on the signal; the modulation depth of an amplitude modulation on the signal; the modulation frequency of a frequency modulation on the signal; the frequency sweep of a frequency modulation on the signal; the phase of a phase modulation on the signal; the modulation frequency of a phase modulation on the signal; the duty cycle of a pulse modulation on the signal; the modulation frequency of a pulse modulation on the signal; the frequency stability of the signal; or the phase noise of the signal; generating a profile of the speed radar signal based upon the at least one characteristic; comparing the profile to one or more known profiles; and suppressing the delivery of an alert signal based upon the results of the comparison.

11. A radar detector for generating an alert in response to a speed radar signal comprising: a radar detection antenna for receiving a signal; an alert unit for alerting the user of the presence of a speed radar signal; a memory unit for storing at least one database; a memory unit for storing at least one database containing a plurality of known radar signal characteristic threshold values; wherein the plurality of known radar signal threshold values is associated with at least one of the following: the structure of the amplitude of the signal over a predetermined distance; the modulation frequency of an amplitude modulation on the signal; the modulation depth of an amplitude modulation on the signal; the modulation frequency of a frequency modulation on the signal; the frequency sweep of a frequency modulation on the signal; the phase of a phase modulation on the signal; the modulation frequency of a phase modulation on the signal; the duty cycle of a pulse modulation on the signal; the modulation frequency of a pulse modulation on the signal; the frequency stability of the signal; or the phase noise of the signal; a central processing unit connected to the antenna, the alert unit, and the memory unit, wherein the central processing unit determines at least one characteristic of the received signal and generates a signal profile value of the signal based upon the at least one determined characteristic, wherein the signal profile value is compared to a threshold value and based upon the comparison suppressing the delivery of an alarm signal to the alert unit.

12. A method of controlling an alert signal, by a device, upon receiving a speed radar signal, the method comprising the steps of: detecting the incoming speed radar signal; determining at least one characteristic of the speed radar signal; wherein the at least one characteristic is one of the following: the structure of the amplitude of the signal over a predetermined distance; the modulation frequency of an amplitude modulation on the signal; the modulation depth of an amplitude modulation on the signal; the modulation frequency of a frequency modulation on the signal; the frequency sweep of a frequency modulation on the signal; the phase of a phase modulation on the signal; the modulation frequency of a phase modulation on the signal; the duty cycle of a pulse modulation on the signal; the modulation frequency of a pulse modulation on the signal; the frequency stability of the signal; or the phase noise of the signal; generating a signal profile value of the speed radar signal based upon the at least one characteristic; comparing the signal profile value to a threshold value; and suppressing the delivery of an alert signal based upon the comparison.

* * * * *